United States Patent
Labrot et al.

(10) Patent No.: US 9,816,027 B2
(45) Date of Patent: Nov. 14, 2017

(54) METHOD FOR PRODUCING A FILM HAVING LUMINESCENT PARTICLES

(75) Inventors: Michael Labrot, Aachen (DE); Monique Elmer, Emsdetten (DE); Jean Sablayrolles, Crouy en Thelle (FR); Frederic Clabau, Paris (FR)

(73) Assignee: SEKISUI CHEMICAL CO., LTD., Osaka (JP)

( * ) Notice: Subject to any disclaimer, the term of this patent is extended or adjusted under 35 U.S.C. 154(b) by 361 days.

(21) Appl. No.: 14/110,916

(22) PCT Filed: Feb. 10, 2012

(86) PCT No.: PCT/EP2012/052338
§ 371 (c)(1),
(2), (4) Date: Dec. 11, 2013

(87) PCT Pub. No.: WO2012/139788
PCT Pub. Date: Oct. 18, 2012

(65) Prior Publication Data
US 2014/0218803 A1    Aug. 7, 2014

(30) Foreign Application Priority Data

Apr. 15, 2011  (EP) .................................. 11162567

(51) Int. Cl.
*C09K 11/06*      (2006.01)
*G02B 27/01*      (2006.01)
(Continued)

(52) U.S. Cl.
CPC ............ *C09K 11/06* (2013.01); *B29C 47/786* (2013.01); *B29C 47/802* (2013.01);
(Continued)

(58) Field of Classification Search
CPC ........ B32B 17/10779; B32B 17/10018; B32B 17/10669; B32B 17/10036; B32B 27/08;
(Continued)

(56) References Cited

U.S. PATENT DOCUMENTS 2,490,662 A   12/1949 Thomsen
5,549,786 A    8/1996 Jones et al.
(Continued)

FOREIGN PATENT DOCUMENTS

CN       1464884 A     12/2003
CN     101302301 A     11/2008
(Continued)

OTHER PUBLICATIONS

PCT International Search Report issued on Nov. 5, 2012 for PCT/EP2012/052338 filed on Feb. 10, 2012 in the name of Saint-Gobain Glass France.
(Continued)

*Primary Examiner* — Jie Lei
(74) *Attorney, Agent, or Firm* — Cheng Law Group, PLLC

(57) ABSTRACT

A method for producing a film having luminescent particles is described. The method has steps a) mixing a thermoplastic and a luminescent pigment containing a hydroxyalkyl terephthalate of the formulate: $R_1$—COO—P(OH)x-COO—$R_2$ and obtaining a thermoplastic mixture; and b) homogenizing the thermoplastic mixture to 150° C. to 200° C. in an extruder, by way of an extrusion nozzle, and obtaining a thermoplastic film.

7 Claims, 3 Drawing Sheets

Figure 1:
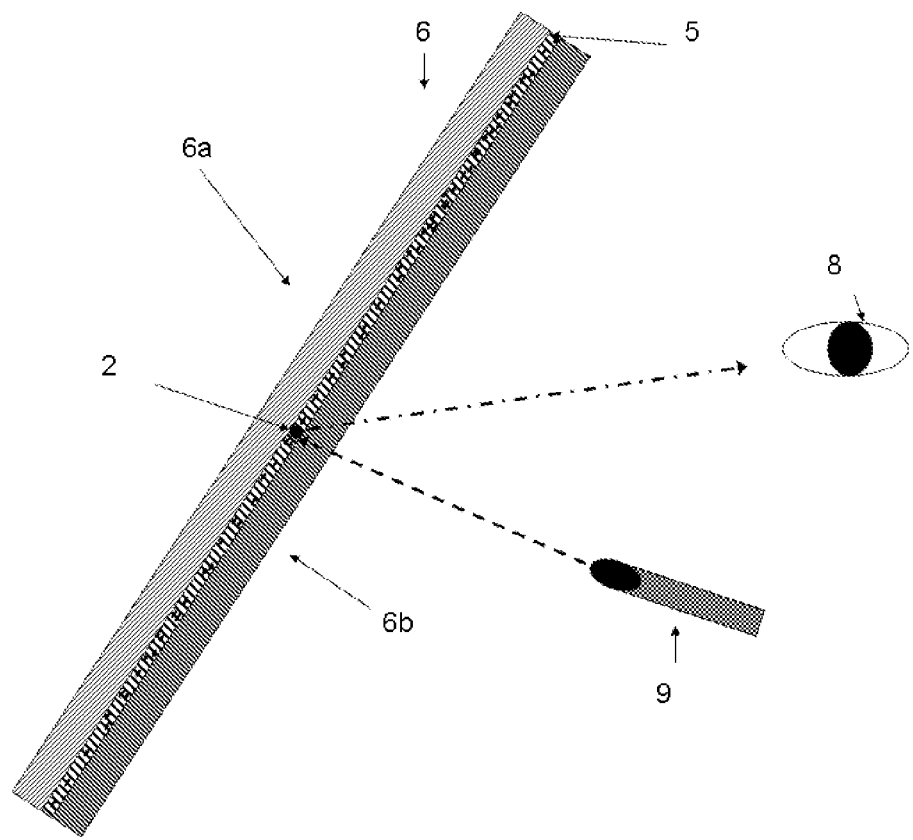

(51) Int. Cl.
  *B32B 17/10* (2006.01)
  *C09K 9/02* (2006.01)
  *B29C 47/78* (2006.01)
  *B29C 47/80* (2006.01)
  *B29C 47/82* (2006.01)

(52) U.S. Cl.
  CPC ...... *B29C 47/827* (2013.01); *B32B 17/10669* (2013.01); *B32B 17/10779* (2013.01); *C09K 9/02* (2013.01); *G02B 27/0101* (2013.01); *B32B 2457/20* (2013.01); *B32B 2551/00* (2013.01); *C09K 2211/1007* (2013.01); *C09K 2211/1014* (2013.01); *G02B 2027/0112* (2013.01); *Y10T 428/31616* (2015.04)

(58) Field of Classification Search
  CPC ............ B32B 2551/00; B32B 2457/20; G02B 27/0101; G02B 27/0103; G02B 27/0172; G02B 5/32; G02B 5/3033; G02B 2027/0112; C09K 11/06; C09K 9/02; C09K 2211/1014; C09K 2211/1007; G21K 4/00; B29C 47/0004; B29C 55/00; B29C 47/802; B29C 47/827; B29C 47/786; B60J 1/02; Y10T 428/31616
  USPC .......... 359/13, 630; 428/430, 432, 442, 339; 264/1.34, 21, 211.12, 291; 252/301.35; 296/84.1
  See application file for complete search history.

(56) References Cited

U.S. PATENT DOCUMENTS

| | | | |
|---|---|---|---|
| 5,573,842 | A | 11/1996 | Gutweiler |
| 6,002,505 | A | 12/1999 | Kraenert et al. |
| 6,072,686 | A | 6/2000 | Yarbrough |
| 6,670,603 | B2 | 12/2003 | Shimada et al. |
| 6,708,595 | B1 | 3/2004 | Chaussade et al. |
| 6,879,499 | B2 | 4/2005 | Matsumoto |
| 7,012,746 | B2 | 3/2006 | Bermel |
| 7,090,355 | B2 | 8/2006 | Liu et al. |
| 7,230,767 | B2 | 6/2007 | Walck et al. |
| 7,261,842 | B2 | 8/2007 | Henry et al. |
| 8,072,686 | B2 | 12/2011 | Cui et al. |
| 8,339,332 | B2 | 12/2012 | Kanou |
| 8,487,277 | B2 | 7/2013 | Labrot et al. |
| 8,519,362 | B2 | 8/2013 | Labrot et al. |
| 8,722,195 | B2 | 5/2014 | Labrot et al. |
| 2001/0005262 | A1 | 6/2001 | Tsurushima |
| 2001/0041251 | A1 | 11/2001 | Bravet et al. |
| 2002/0120916 | A1 | 8/2002 | Snider, Jr. |
| 2003/0166788 | A1 | 9/2003 | Papenfuhs |
| 2003/0193044 | A1 | 10/2003 | Henry et al. |
| 2005/0007562 | A1 | 1/2005 | Seki et al. |
| 2005/0074591 | A1 | 4/2005 | Zagdoun |
| 2005/0077647 | A1* | 4/2005 | Coyle ................... B29C 43/222 264/211.12 |
| 2006/0065735 | A1 | 3/2006 | Li et al. |
| 2006/0153558 | A1 | 7/2006 | Tan et al. |
| 2006/0171007 | A1 | 8/2006 | Chen et al. |
| 2006/0221021 | A1 | 10/2006 | Hajjar et al. |
| 2006/0221022 | A1 | 10/2006 | Hajjar |
| 2006/0227087 | A1 | 10/2006 | Hajjar et al. |
| 2006/0244925 | A1 | 11/2006 | Seki et al. |
| 2007/0014318 | A1 | 1/2007 | Hajjar et al. |
| 2007/0046176 | A1 | 3/2007 | Bukesov et al. |
| 2007/0187616 | A1 | 8/2007 | Burroughs et al. |
| 2007/0188417 | A1 | 8/2007 | Hajjar et al. |
| 2007/0206258 | A1 | 9/2007 | Malyak et al. |
| 2007/0228927 | A1 | 10/2007 | Kindler et al. |
| 2008/0203901 | A1 | 8/2008 | Bukesov |
| 2008/0231738 | A1 | 9/2008 | Iida |
| 2008/0259431 | A1 | 10/2008 | Weichmann et al. |
| 2008/0291140 | A1 | 11/2008 | Kent et al. |
| 2008/0318063 | A1 | 12/2008 | Anderson |
| 2009/0033884 | A1 | 2/2009 | Yonekubo et al. |
| 2009/0115100 | A1* | 5/2009 | Nakai ..................... B29C 55/08 264/291 |
| 2009/0141496 | A1 | 6/2009 | Yamamoto et al. |
| 2009/0153582 | A1 | 6/2009 | Hajjar et al. |
| 2009/0174632 | A1 | 7/2009 | Hajjar et al. |
| 2010/0063176 | A1 | 3/2010 | Kato et al. |
| 2010/0243858 | A1 | 9/2010 | Newman et al. |
| 2010/0253600 | A1 | 10/2010 | Seder et al. |
| 2011/0073773 | A1 | 3/2011 | Labrot et al. |
| 2011/0074660 | A1 | 3/2011 | Hajjar et al. |
| 2011/0076473 | A1 | 3/2011 | Lin et al. |
| 2011/0109529 | A1 | 5/2011 | Hajjar et al. |
| 2011/0141150 | A1 | 6/2011 | Hajjar et al. |
| 2011/0164158 | A1 | 7/2011 | Iida |
| 2011/0176208 | A1 | 7/2011 | Kindler et al. |
| 2011/0181948 | A1 | 7/2011 | Kindler et al. |
| 2011/0291554 | A1 | 12/2011 | Bukesov et al. |
| 2012/0068083 | A1 | 3/2012 | Labrot et al. |
| 2012/0299328 | A1* | 11/2012 | Labrot ............... B32B 17/10036 296/84.1 |
| 2014/0218803 | A1 | 8/2014 | Labrot et al. |
| 2014/0232707 | A1 | 8/2014 | Alschinger et al. |
| 2016/0011414 | A1 | 1/2016 | Joseph |

FOREIGN PATENT DOCUMENTS

| | | |
|---|---|---|
| DE | 822 714 | 11/1951 |
| DE | 4024330 | 2/1992 |
| DE | 199 18 811 A1 | 11/2000 |
| DE | 10002152 | 7/2001 |
| DE | 103 50 529 A1 | 3/2005 |
| DE | 10 2005 061 855 A1 | 7/2007 |
| DE | 60314613 | 3/2008 |
| DE | 102009044181 | 4/2011 |
| EP | 0 157 030 A1 | 10/1985 |
| EP | 0 597 391 A | 5/1994 |
| EP | 0 734 852 A2 | 10/1996 |
| EP | 0 990 941 A2 | 4/2000 |
| EP | 2 110 237 A1 | 10/2009 |
| EP | 2 233 962 A2 | 9/2010 |
| FR | 2 929 016 A1 | 9/2009 |
| FR | 2 929 017 A1 | 9/2009 |
| GB | 2 424 382 A | 9/2006 |
| JP | H07149988 A | 6/1995 |
| JP | 9-327898 A | 12/1997 |
| JP | H10119110 A | 5/1998 |
| JP | 2000-165352 A | 6/2000 |
| JP | 2001113588 A | 4/2001 |
| JP | 2001-249399 A | 9/2001 |
| JP | 2002-241371 A | 8/2002 |
| JP | 2003340851 A | 12/2003 |
| JP | 2004-341210 A | 12/2004 |
| JP | 2007001122 A | 1/2007 |
| JP | 2007-527548 A | 9/2007 |
| JP | 2008-235681 A | 10/2008 |
| JP | 2008-260498 A | 10/2008 |
| JP | 2009-86182 A | 4/2009 |
| JP | 2009-139940 A | 6/2009 |
| JP | 2009-145846 A | 7/2009 |
| JP | 2009-539120 A | 11/2009 |
| JP | 2010-243940 A | 10/2010 |
| JP | 2010-271443 A | 12/2010 |
| KR | 10-1999-0071481 A | 9/1999 |
| KR | 2000-0068557 A | 11/2000 |
| KR | 10-2005-0066398 A | 6/2005 |
| WO | 0194496 | 12/2001 |
| WO | 2004/099172 | 11/2004 |
| WO | WO 2007/039850 A1 | 4/2007 |
| WO | WO 2008/132368 A2 | 11/2008 |
| WO | 2010139889 | 12/2010 |
| WO | WO 2011/042384 A1 | 4/2011 |

OTHER PUBLICATIONS

Written Opinion of the International Searching Authority issued on Nov. 5, 2012 for PCT/EP2012/052338 filed on Feb. 10, 2012 in the name of Saint-Gobain Glass France (English + German).

(56) References Cited

OTHER PUBLICATIONS

Day, M. et al, "Photochemical Degradation of Poly(ethylene Terephthalate). I. Irradiation Experiments with the Xenon and Carbon Arc", Journal of Applied Polymer Science, 1972, vol. 16, pp. 175-189.
Edge, M. et al., "Identification of luminescent species contributing to the yellowing of poly(ethylene terephthalate) on degradation", Polymer, 1995, vol. 36, No. 2, pp. 227-234.
International Search Report for the Application No. PCT/EP2010/064734 dated Jan. 19, 2011.
Written Opinion of the International Searching Authority (PCT/ISA/237) for Application No. PCT/EP2010/064734 dated Jan. 19, 2011.
Non-Final Office Action for the U.S. Appl. No. 13/499,235 from the United States Patent and Trademark Office dated Oct. 1, 2013.
Notice of Allowance for the U.S. Appl. No. 13/499,235 from the United States Patent and Trademark Office dated Mar. 14, 2014.
International Search Report for the Application No. PCT/EP2011/064354 dated Nov. 3, 2011.
Written Opinion of the International Searching Authority (PCT/ISA/237) for Application No. PCT/EP2011/064354 dated Nov. 3, 2011.
International Search Report for the Application No. PCT/EP2012/064666 dated Oct. 5, 2012.
Written Opinion of the International Searching Authority (PCT/ISA/237) for Application No. PCT/EP2012/064666 dated Oct. 5, 2012.

\* cited by examiner

METHOD FOR PRODUCING A FILM HAVING LUMINESCENT PARTICLES

CROSS REFERENCE TO RELATED APPLICATIONS

The present application is the US national stage of International Patent Application PCT/EP2012/052338 filed on Feb. 10, 2012 which, in turn, claims priority to European Patent Application EP 11162567.9 filed on Apr. 15, 2011.

The invention relates to a method for producing a film having luminescent particles, a film having luminescent particles, a device, and its use.

Head-up displays (HUDs) are widespread in aviation. The systems mounted in the direct field of vision of pilots display the most important data about their own and other aircraft. These systems, established and much used in the military sector, also have many possibilities for use in the civil sector, in particular in the automobile sector. Thus, data about the speed, the distance from the preceding vehicle or directional data from the navigation equipment can, in contrast to head-down displays (HDDs), be displayed right at the eye level of the driver. These capabilities clearly improve the traffic safety of the vehicle as the driver cannot watch the traffic situation while looking at the instruments. With increased speeds of the motor vehicle, on freeways, for example, the distance traveled "blind" by the vehicle can be significant and can cause an increased accident risk.

If head-up displays (HUDs) are illuminated by an external light source, such as a laser, the light fields can be seen only with difficulty depending on the prevailing light and weather conditions. Strong sunlight and light reflection through drops of water or dirt particles make seeing the data projected in the head-up display significantly more difficult. This is particularly clearly evident with virtual images that are projected onto the display area, for example, the front window. Disadvantages of these conventional HUDs are, additionally, the limited field of vision for displaying the projected data. Real images generated on the display area by electromagnetically excited dyes or pigments constitute a possible approach to a solution. In principle, the entire pane can be used as the information carrier.

Because of the size of the pane and the tendency of the pigments to distribute themselves uniformly in the adhesive layer, relatively high concentrations of the chromophoric pigments are necessary. However, in many cases high pigment concentrations are very expensive and sometimes require special precautionary measures in light of the regulatory classification and handling of pigments or dyes as hazardous substances. The high pigment concentrations require, at the same time, a high use of solvents. These in many cases readily volatile organic compounds (VOC) represent a constant hazard to the environment and health. In particular, with long-term exposure, damage to health is possible. Also, in many cases, the solvents cannot be reused and thus represent a substantial cost factor in the production of HUDs.

DE 603 14 613 T2 discloses a photochromic composition and a method for its production. The composition contains a linear, cross-linkable polyurethane or polyurethane-urea polymer and a photochromic organic compound.

WO 2004/099172 A1 discloses a photochromic composition on a benzo-, naphtho-, and phenathrochromic structure, substituted with an arylamine group.

U.S. Pat. No. 7,230,767 B2 discloses an image display system in a motor vehicle window pane. The arrangement contains luminescent compounds on the outward facing side of the inner pane. The luminescent compounds are illuminated by a light source and appear in the field of vision of an automobile driver.

DE 100 02 152 A1 discloses a transparent, colored, UV-absorbing film. The film is produced by extrusion methods in which a thermoplastic and a dye soluble in the film are mixed and then extruded together.

The object of the invention is to provide a method for producing a PVB film for head-up displays that reduces or avoids the use of readily volatile organic solvents.

The object of the present invention is accomplished according to the invention by a method in accordance with independent claim 1. Preferred embodiments emerge from the subclaims.

A device according to the invention for producing a glass pane with a head-up display and its use emerge from other dependent claims.

The method according to the invention includes, in a first step, the mixing of a thermoplastic (granulate) with a luminescent pigment. The thermoplastic granulate preferably includes PVB (polyvinyl butyral) or EVA (poly-ethyl vinyl acetate). Optionally, polybutylene terephthalate (PBT), polycarbonate (PC), polyethylene terephthalate (PET) and polyethylene naphthalate (PEN), polyvinyl chloride (PVC), polyvinyl fluoride (PVF), polyvinyl butyral (PVB) without plasticizers, and/or copolymers thereof, particularly preferably polyethylene terephthalate (PET), can also be included. The luminescent pigment contains a hydroxyalkyl terephthalate having the formula: $R_1$—COO—P(OH)x(1-4)-COO—$R_2$, where $R_1$ and $R_2$ can be an alkyl, aryl, or allyl radical having 1 to 10 C atoms, P a phenyl ring, OH hydroxyl groups bonded to the phenyl ring, and x is the number of hydroxyl groups bonded to the phenyl ring. The hydroxyalkyl terephthalate preferably has the formula: $R_1$—COO—P(OH)x(2-4)-COO—$R_2$. The general structural formula is:

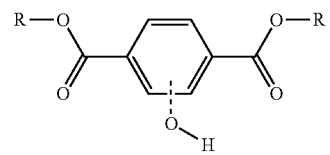

The luminescent pigment preferably contains diethyl 2,5-dihydroxyterephtalate. The structural formula is

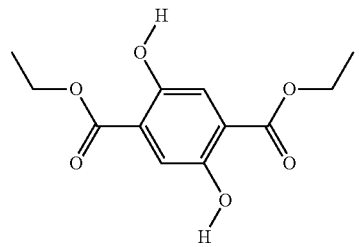 [SMILES: CCOC(=O)c1cc(O)c(C(=O)OCC)cc1O]

The luminescent pigment used has a local excitation maximum in the range from 350 nm to 450 nm and a local emission maximum in the range from 400 nm to 800 nm. In the context of the invention, the term "local" describes a region with a width of 50 nm. The luminescent pigments contain, in the context of the invention, organic and/or inorganic luminescent compounds, ions, aggregates, and/or molecules. Luminescence includes fluorescence and/or phosphorescence processes, excitation with electromagnetic radiation, and emission of electromagnetic radiation. The radiation emitted preferably has a different wavelength from the exciting radiation. The radiation emitted preferably has a higher wavelength.

The thermoplastic mixture obtained is then filled into an extruder. In the next step, the thermoplastic mixture is homogenized in the extruder at 150° C. to 200° C. and, then, a thermoplastic film is obtained. The luminescent pigment is surprisingly temperature stable in the method according to the invention and survives, in particular, the extrusion step. In a subsequent step, the thermoplastic film is cooled. This can take place, for example, using air or by quenching with water.

The thermoplastic film obtained preferably has light transmission of >70%, particularly preferably >82%, measured at a wavelength of 405 nm. The light transmission of the thermoplastic film can be set by film thickness, polymer composition, degree of polymerization, distribution of polymerization, UV blockers, or plasticizers.

The thermoplastic film preferably contains 0.1 g/m$^2$ to 15 g/m$^2$ of luminescent pigment. The quantity indications are based on a thickness of the thermoplastic film of roughly 0.76 mm.

The luminescent pigment used in the method preferably has an excitation maximum in the range from 380 nm to 420 nm and/or an emission maximum in the range from 400 nm to 800 nm, preferably 430 nm to 500 nm. The luminescent pigment is surprisingly temperature stable in the method according to the invention and survives, in particular, the extrusion step. This was confirmed through aging tests on extruded thermoplastic films.

The luminescent pigment preferably contains benzopyranes, naphthopyranes, 2H-naphthopyranes, 3H-naphthopyranes, 2H-phenanthropyranes, 3H-phenanthropyranes, photochromic resins, coumarins, xanthines, naphthalinic acid derivatives, oxazoles, stilbenes, styryls, perylenes, lanthanides, preferably $Y_2O_3$:Eu, $YVO_4$:Tm, $Y_2O_2S$:Pr, $Gd_2O_2S$:Tb, and/or mixtures thereof.

The extruder is preferably heated in the extruder intake to a mean temperature of 135° C. to 150° C. The term "extruder intake" refers, in the context of the invention, to the region of the feeding of the material, i.e., the first 20% of the length of the extruder screw.

The extruder is preferably heated in the extruder middle to a mean temperature of 150° C. to 170° C. The term "extruder middle" refers, in the context of the invention, to the middle 60% of the length of the extruder screw.

The extruder is preferably heated in the extruder discharge to a mean temperature of 160° C. to 180° C. The term "extruder discharge" refers, in the context of the invention, to the last 20% of the length of the extruder screw all the way to the discharge.

The thermoplastic film is preferably conveyed in the extruder via a single extruder screw.

The thermoplastic film is preferably conveyed with an extrusion rate of 10 mm/s to 20 mm/s.

The thermoplastic film is preferably conveyed in a diameter of 0.3 mm to 1 mm.

The thermoplastic mixture preferably contains 0.5 g to 8 g of luminescent pigment per kg of thermoplastic, particularly preferably 2 g to 5 g of luminescent pigment per kg of thermoplastic.

The thermoplastic mixture preferably contains antioxidants.

The invention further includes a thermoplastic film, produced according to the method according to the invention. The thermoplastic film according to the invention preferably has no solvent residues since the luminescent pigments are mixed without solvents.

The invention also includes a composite glass pane with a thermoplastic film according to the invention in the intermediate layer between the individual panes of the composite glass pane. The thermoplastic film according to the invention can be part of the intermediate layer or can by itself constitute the intermediate layer.

The invention further includes a device for displaying a pictogram, graphic characters, and/or numbers. The device according to the invention includes a composite glass pane and a thermoplastic film according to the invention disposed between the panes of the composite glass pane. A light source aimed at the composite glass pane emits electromagnetic radiation onto the composite glass pane. The radiation emitted by the light source is absorbed by the luminescent pigments in the adhesive layer and is re-emitted with a changed wavelength. This emitted radiation is perceived by the viewer as a pixel on the pane. The light source preferably comprises a diode laser or a laser scanner. The individual panes of the composite glass pane preferably have a thickness of 1 mm to 8 mm, particularly preferably 1.4 mm to 2.5 mm.

The invention includes, moreover, the use of the thermoplastic film in head-up displays in buildings, motor vehicles, airplanes, and/or helicopters, preferably in head-up displays of windshields in motor vehicles or billboards.

In the following, the invention is explained in detail with reference to drawings. The drawings are purely schematic representations and are not to scale. They in no way restrict the invention.

Figure 2:
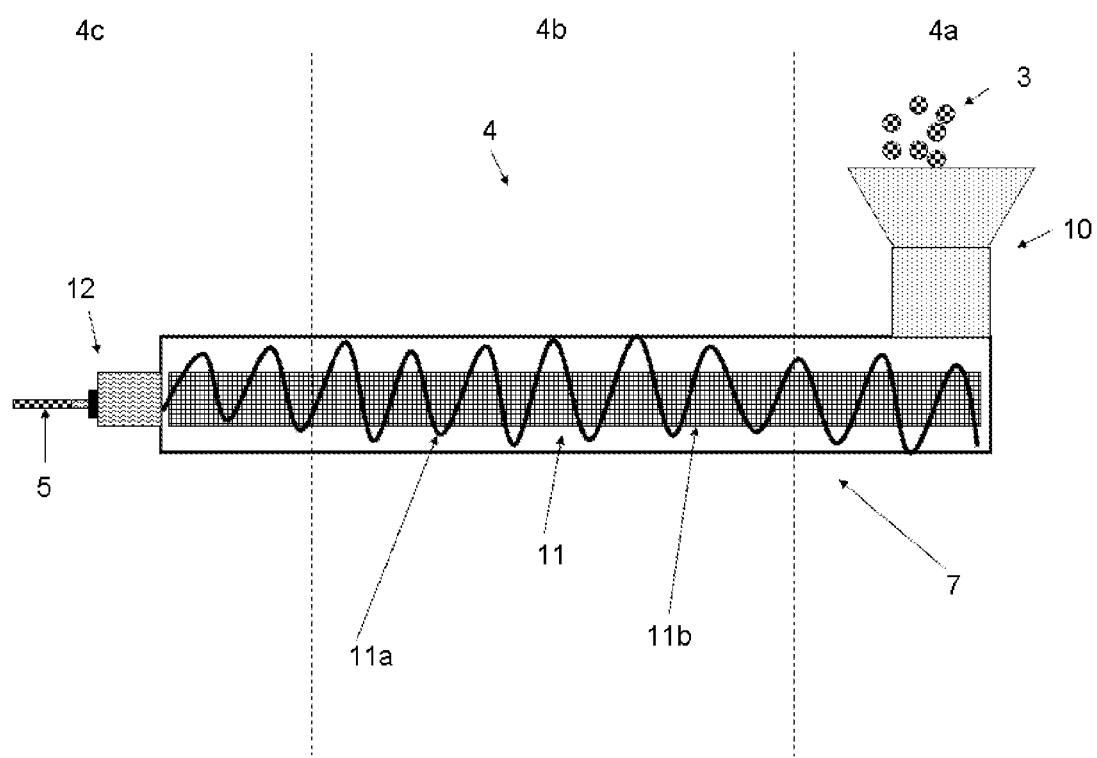
Figure 3:
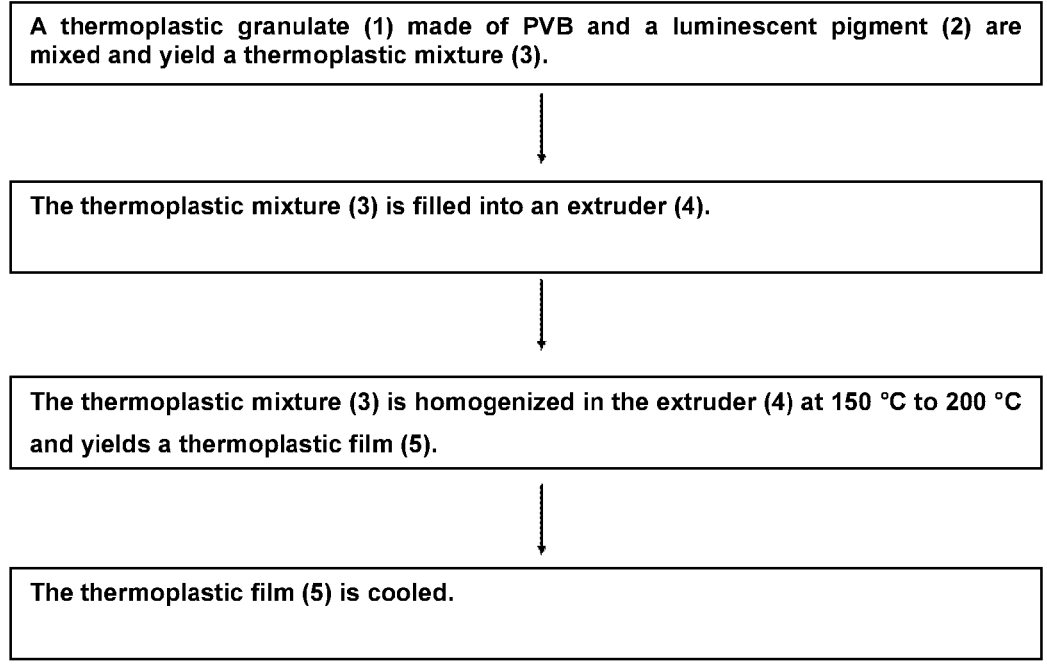

They depict:

FIG. 1 a cross-section of the device according to the invention,

FIG. 2 a cross-section of the extruder used in the method according to the invention, and FIG. 3 a flowchart of the method according to the invention.

FIG. 1 depicts a cross-section of the device according to the invention. The composite glass pane (6) made of inner pane (6b), intermediate layer (thermoplastic film) (5), and outer pane (6a) is illuminated by a light source (9), preferably a diode laser. The luminescent pigments (2) situated in the intermediate layer (5) emit light that is perceived by the viewer (8) as a signal or pictogram.

FIG. 2 depicts a cross-section of the extruder (4) used in the method according to the invention, which comprises the above-described regions extruder intake (4a) comprising a first 20% of the length of the extruder screw, extruder middle (4b), and extruder discharge (4c) comprising a last 20% of the length of the extruder screw. The extruder (4) has, from the extruder intake (4a) comprising a first 20% of the length of the extruder screw to the extruder discharge (4c) comprising a last 20% of the length of the extruder screw, a temperature gradient from 130° C. to 190° C., preferably from 140° C. to 170° C. The extruder screw (11) installed in the extruder housing (7) comprises a screw thread (11a) and a screw shaft (11b). The thermoplastic mixture (3) made of a thermoplastic granulate (1) and a luminescent pigment (2) with a local excitation maximum in the range from 350 nm to 450 nm and a local emission maximum in the range from 400 nm to 800 nm arrives in the extruder (6) via the extruder feeder (10). The thermoplastic mixture (3) melted and homogenized in the extruder (4) is conveyed as a thermoplastic film (5) at a preferred rate of 14 mm/s.

FIG. 3 depicts a flowchart of the method according to the invention. In a first step, the mixing of the thermoplastic granulate (1) with a luminescent pigment (2) takes place. The thermoplastic granulate preferably includes PVB (polyvinyl butyral). The luminescent pigment (2) used has a local excitation maximum in the range from 350 nm to 450 nm and a local emission maximum in the range from 400 nm to 800 nm. The thermoplastic mixture (3) obtained is then filled into an extruder (4). In the next step, the thermoplastic mixture (3) is homogenized in the extruder (4) at 150° C. to 200° C. and, then, a thermoplastic film (5) is obtained. In a subsequent step, the thermoplastic film (5) is cooled. This can take place using air or by quenching with water.

With the method according to the invention, a thermoplastic film (5) is obtained that has, in contrast to known films, no solvent residues since production takes place without solvents.

LIST OF REFERENCE CHARACTERS (1) thermoplastic/thermoplastic granulate
(2) luminescent pigment
(3) thermoplastic mixture
(4) extruder
(4a) extruder intake
(4b) extruder middle
(4c) extruder discharge
(5) thermoplastic film
(6) composite glass pane
(6a) outer pane
(6b) inner pane
(7) extruder housing
(8) viewer
(9) light source
(10) extruder feeder
(11) extruder screw
(11a) screw thread
(12a) screw shaft
(12) extruder nozzle

The invention claimed is:

1. A method for producing a film having luminescent particles, comprising:

a. mixing a thermoplastic and a luminescent pigment containing a hydroxyalkyl terephthalate of the formula $R_1$—COO—P(OH)x-COO—$R_2$, thereby obtaining a thermoplastic mixture without a solvent, wherein the thermoplastic mixture contains 0.5 g to 8 g of luminescent pigment per kg of the thermoplastic, wherein $R_1$, $R_2$ is an alkyl, aryl, or allyl radical having 1 C to 10 C atoms, P is a phenyl ring, OH is a hydroxyl group bound to the phenyl ring, and x is an integer from 1 to 4, and b. homogenizing the thermoplastic mixture in an extruder at 150° C. to 200° C., and obtaining a thermoplastic film via an extrusion nozzle of the extruder, wherein the extruder is heated in an extruder intake comprising a first 20% of the length of the extruder screw to a temperature of 135° C. to 150° C., wherein the extruder is heated in an extruder middle to temperature of 150° C. to 170° C., wherein the extruder is heated in an extruder discharge comprising a last 20% of the length of the extruder screw to a temperature of 160° C. to 180° C., and wherein the thermoplastic film is conveyed with an extrusion rate of 10 mm/s to 20 mm/s.

2. The method according to claim 1, wherein the luminescent pigment contains diethyl 2,5-dihydroxyterephtalate.

3. The method according to claim 1, wherein the luminescent pigment has an excitation maximum in a range from 380 nm to 420 nm and/or an emission maximum in a range from 430 nm to 500 nm.

4. The method according to claim 1, wherein the luminescent pigment comprises benzopyranes, naphthopyranes, 2H-naphthopyranes, 3H-naphthopyranes, 2H-phenanthropyranes, 3H-phenanthropyranes, photochromic resins, coumarins, xanthines, naphthalinic acid derivatives, oxazoles, stilbenes, styryls, perylenes, lanthanides, preferably $Y_2O_3$: Eu, $YVO_4$:Tm, $Y_2O_2S$:Pr, $Gd_2O_2S$:Tb, and/or mixtures thereof.

5. The method according to claim 1, wherein the thermoplastic film is conveyed in the extruder via a single extruder screw.

6. The method according to claim 1, wherein the thermoplastic film is conveyed in a thickness of 0.3 mm to 1 mm.

7. The method according to claim 6, wherein the thickness is 0.76 mm.

* * * * *